United States Patent
Craig, Jr.

(10) Patent No.: US 7,721,393 B2
(45) Date of Patent: May 25, 2010

(54) SIZE-CONSCIOUS HOSE CLAMP

(76) Inventor: Paul M. Craig, Jr., 207 Quaint Acres Dr., Silver Spring, MD (US) 20904

(*) Notice: Subject to any disclaimer, the term of this patent is extended or adjusted under 35 U.S.C. 154(b) by 737 days.

(21) Appl. No.: 11/648,768

(22) Filed: Jan. 3, 2007

(65) Prior Publication Data

US 2008/0155794 A1    Jul. 3, 2008

(51) Int. Cl.
*F16L 33/02*    (2006.01)
(52) U.S. Cl. .................................... 24/20 R
(58) Field of Classification Search ........... 24/20 R, 24/20 CW, 20 EE, 20 TT, 20 W
See application file for complete search history.

(56) References Cited

U.S. PATENT DOCUMENTS

| | | | | |
|---|---|---|---|---|
| 3,321,811 A | * | 5/1967 | Thomas | 24/20 R |
| 4,622,720 A | * | 11/1986 | Oetiker | 24/20 TT |
| 4,742,600 A | * | 5/1988 | Calmettes et al. | 24/20 R |
| 4,991,266 A | * | 2/1991 | Oetiker | 24/20 R |
| 5,274,886 A | * | 1/1994 | Oetiker | 24/20 TT |
| 5,339,496 A | * | 8/1994 | Oetiker | 24/20 CW |
| 5,669,113 A | * | 9/1997 | Fay | 24/20 CW |
| 5,918,350 A | * | 7/1999 | Detable et al. | 24/20 TT |
| 6,178,601 B1 | * | 1/2001 | Craig, Jr. | 24/20 R |
| 2002/0189055 A1 | * | 12/2002 | Oetiker et al. | 24/20 CW |
| 2003/0101544 A1 | * | 6/2003 | Kitamura et al. | 24/20 CW |
| 2004/0134042 A1 | * | 7/2004 | Craig, Jr. | 24/20 EE |

* cited by examiner

Primary Examiner—James R Brittain

(57) ABSTRACT

An open-type hose clamp which comprises a plastically deformable "Oetiker" ear as tightening device that requires a predetermined minimum plastic deformation for desired operation. Proper operation of the "Oetiker" ear is assured by a lost motion connection. The lost motion connection which also forms the mechanical connection between overlapping band portions includes at least one outwardly extending member extending outwardly from the inner band portion and adapted to engage in a corresponding aperture in the outer band portion, whereby the mechanical connection is such as to prevent use of an undersize clamp with a given hose and to assure a lock up of the mechanical connection upon engagement of the outwardly extending member in the aperture during tightening of the clamp.

21 Claims, 2 Drawing Sheets

SIZE-CONSCIOUS HOSE CLAMP

FIELD OF THE INVENTION

The present invention relates to hose clamps with so-called "Oetiker" plastically deformable ears as tightening devices which assure adequate plastic deformation of the ear under all conditions. Additionally, the present invention relates to hose clamps of the open type in which the mechanical connection between overlapping band portions is effectively locked up during installation of the clamp.

BACKGROUND OF THE INVENTION

Hose clamps with plastically deformed ear-like tightening devices known in the trade as so-called "Oetiker" ears have proved immensely successful and have been used in clamps commercially sold in the hundreds of millions. The success of the "Oetiker" ear is attributable to the holding ability of a clamp provided with such a tightening device as well as to the automatic compensation for aging and/or fluctuations in pressure and/or temperature of the fluid carried by the hose with which the clamp is used. However, these extraordinarily favorable operating characteristics are attainable only if the "Oetiker" ear is plastically deformed a sufficient amount by contraction of the ear so as to change the more or less rectangular hat-shaped configuration of the original "Oetiker" ear into an approximately omega-shaped configuration with a smoothly rounded external shape causing the corners of the hat-shaped configuration to disappear completely.

To achieve the desired plastic deformation of the "oetiker" ear, it is therefore necessary that the same be contracted a sufficient amount. U.S. Pat. No. 2,614,304 to Oetiker illustrates the desired plastic deformation in FIGS. 2 and 3 thereof. However, it is quite apparent that this necessary contraction of the "Oetiker" ear to achieve the desired plastic deformation is possibly only if the size of the clamp is such that there is sufficient play between the maximum diametric dimension of the clamp in the non-tightened condition and the external hose dimension, illustrated also in FIG. 2 of the '304 Patent. On the other hand, if maximum the size of the clamp in the non-tightened condition is such that it just barely fits over the hose, adequate contraction of the "Oetiker" ear seeking to reduce its diametric dimension is no longer possible. It may then happen that insufficient plastic deformation of the "Oetiker" ear will cause inadequate holding of the clamp.

My prior U.S. application Ser. No. 10/392,952, the subject matter of which is incorporated herein in its entirety by reference, already addressed this problem and suggested a lost-motion connection between overlapping band portions to permit plastic deformation of the "Oetiker" ear sufficient to achieve the desired plastic deformation without reduction of the diametric dimension of the clamp during contraction of the ear.

The maximum outer diametric dimension of a hose with which a clamp can be used has been normally determined by the mechanical connection between overlapping band portions. However, as the mechanical connection of a clamp according to my aforementioned prior U.S. patent application included a lost-motion arrangement, it no longer could function as the means for determining the maximum diametric dimension of the hose with which the clamp could be used and thus required a shift of this function to some guide members that had to be added and located in the clamp with sufficient accuracy to achieve the intended function. In contrast to the solution of my aforementioned prior U.S. patent application, the present invention solves the problem without such additional guide members, concentrating the solution to all problems in a mechanical connection according to this invention that can be readily incorporated into existing mass production techniques for such clamps by merely changing the design of the cutting dies.

In the case of so-called open-type hose clamps which utilized so-called guide hook members as disclosed, for example, in U.S. Pat. No. 3,321,811 to Thomas, there always existed the danger of reopening of the connection during the installation. The hook members as disclosed in the Thomas patent were thereby bent out of the band material through an angle α less than 90° which was intended to prevent normally reopening of the connection. However, as these hook members offered relatively little resistance to a further bending back by the circumferential forces that were exerted on the same during tightening of the clamp, connections with these hook members posed the inherent danger of reopening, for example, when these hook members were bent back through an angle of 90° or more. Any lost-motion connections utilizing such a hook member would thus be prone to the same problem.

As is well known in the art, clamps come in different sizes intended to cover predetermined ranges of diametric dimensions of the hose. The use of an improper clamp size on the assembly line which would preclude sufficient plastic deformation, is unlikely because the clamp sizes are normally carefully chosen for mass production. Additionally the installer would be made aware of the improper size by the likely destruction of the "Oetiker" ear with the use of pneumatically operated tightening tools that would destroy the "Oetiker" ear if it cannot be contracted because of the under-size of the clamp for a given hose.

The present invention also solves this problem by extremely simple means that prevent the installation of the clamp over a hose size that is too large in its diametric dimension for proper plastic deformation of the "Oetiker" ear.

Accordingly, it is an object of the present invention to provide a hose clamp which avoids the aforementioned problems by simple and reliable means.

Another object of the present invention resides in an open-type hose clamp which precludes the installation of an undersized clamp over an excessively large-sized hose.

Still a further object of the present invention resides in a hose clamp with a mechanical connection including a so-called guide hook member which assures proper lock-up of the mechanical connection during the entire tightening operation.

SUMMARY OF THE INVENTION

The present invention solves the aforementioned problems in a reliable manner by utilizing a mechanical connection between overlapping band portions that includes a modified hook member as well as a modified aperture in which the hook member is adapted to engage, whereby the hook member and aperture are so constructed that they serve as lost-motion arrangement and at the same time as lock-up means for the mechanical connection. This is achieved by an aperture having two aperture portions of different width connected by way of converging aperture portions and by a hook member provided with cutouts of such dimensions that the hook member can slide from the wider aperture portion into the narrower aperture portion owing to the presence of the cutouts on both sides of the hook member.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
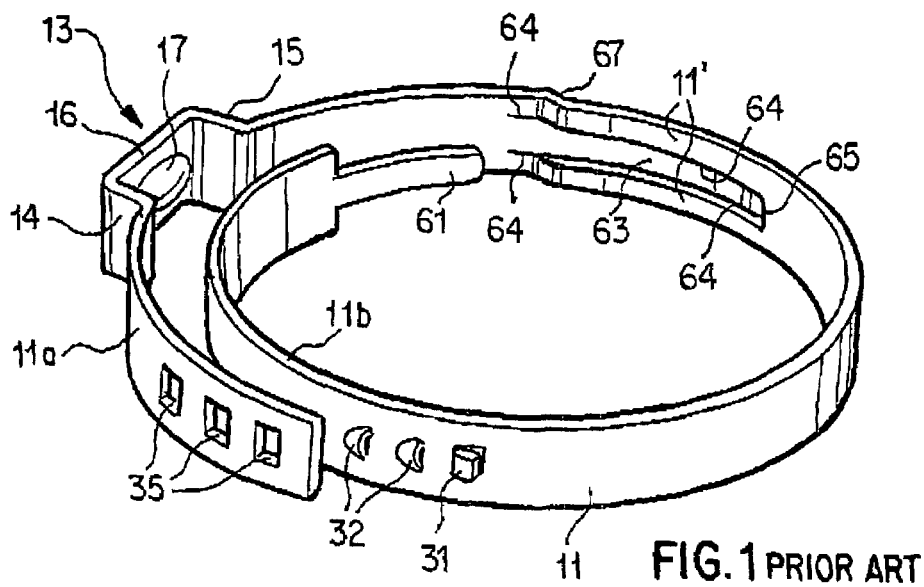
FIG. 1 is a perspective view of a prior art open-type hose clamp as disclosed in U.S. Pat. No. 4,299,012, whose prior art mechanical connection as shown in FIGS. 2 and 3 of the Patent only needs to be modified in accordance with the present invention as shown in FIGS. 5-7 of this application.

Referring now to the drawing, wherein like reference numerals are used throughout the various views to designate like parts, the prior art clamp of FIG. 1, as described in U.S. Pat. No. 4,299,012 includes a clamping band 11 with outer and inner overlapping band portions 11a and 11b and with a plastically deformable ear generally designated by reference numeral 13 and known in the trade as "Oetiker" ear named after its inventor. The "Oetiker" ear is of generally hat-shaped rectangular configuration in its original condition formed by leg members 14 and 15 interconnected by a bridging portion 16 that preferably includes a reinforcing means 17 which may be of any known configuration, for example, as shown in the '012 Patent, in the U.S. Pat. No. 5,305,499 or in the U.S. Pat. No. 6,243,924. To assure an internal clamping surface devoid of any steps, gaps or discontinuities, especially at the end of the inner band portion 11b, the prior art clamp of FIG. 1 further includes a means to avoid such steps, gaps and discontinuities that includes a tongue-like extension 61 at the end of the inner band portion 11b adapted to extend through an opening provided in the step-like portion 67, all as more fully described in the U.S. Pat. No. 4,299,012. The mechanical connection of this prior art clamp, illustrated also in FIGS. 2-4 of this application, includes a rectangularly shaped guide hook member 31 extending outwardly from the inner band portion 11b and adapted to engage in a rectangular aperture 35 in the outer band portion 11a as more fully shown also in FIG. 4 of this patent.

Figure 2:
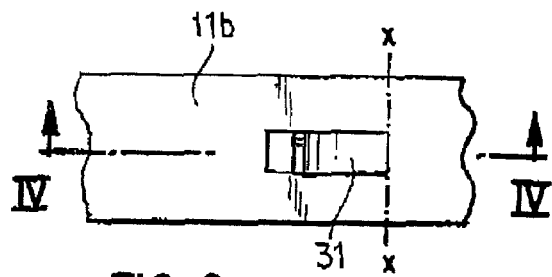
FIG. 2 is a partial, somewhat schematic plan view on an enlarged scale on the inner band portion of the prior art connection used heretofore in the prior art clamp of FIG. 1 herein which is provided with a rectangular guide hook for the mechanical connection of the clamp.
Figure 3:
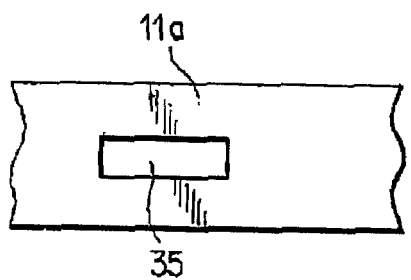
FIG. 3 is a somewhat schematic partial plan view on an enlarged scale on the outer band portion of the prior art mechanical connection of the clamp of FIG. 1 herein which is provided with a rectangular aperture for the guide hook.
Figure 4:
FIG. 4 is a somewhat schematic cross-sectional view taken along line IV-IV of FIG. 2.

The prior art guide hook member 31 is thereby obtained by a cut in the clamping band material of the inner band portion 11b involving three sides of a rectangle as shown in FIGS. 2 and 3 herein to be bent outwardly about the axis x-x also shown in FIG. 2 herein through an angle less than 90°.

As the hook member 31 is extended through the aperture 35, the angle $\alpha$ of less than 90° normally prevents the outer band portion 11a from escaping outwardly during installation owing to any residual stress which is left in the clamping band as a result of the predeformation into approximately circular shape. In other words, the outer clamping band portion 11a has an inherent tendency to return to its prior flat shape which would cause the mechanical connection to reopen, especially if the guide member 31 is bent back through an angle approaching or greater than 90°. In other words the likelihood of re-opening is increased if the guide hook member is further bent back.

DESCRIPTION OF THE INVENTION

Figure 5:
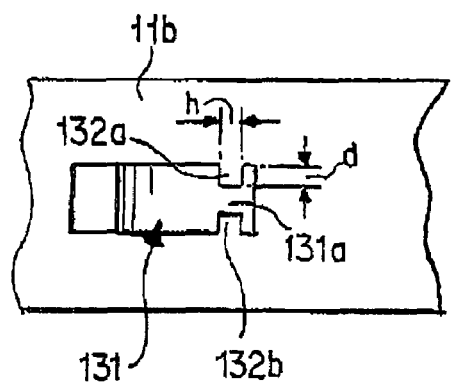
FIG. 5 is a somewhat schematic partial plan view, on an enlarged scale similar to FIG. 2, on the guide member of the mechanical connection in accordance with the present invention provided in the inner band portion.
Figure 6:
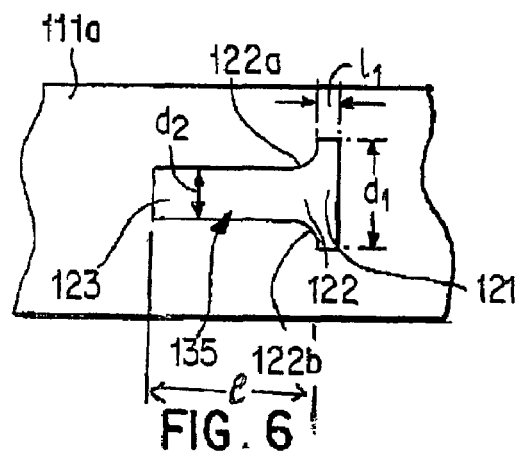
FIG. 6 is a somewhat schematic partial plan view, on an enlarged scale similar to FIG. 3, and illustrating the aperture for the guide hook in the mechanical connection according to the present invention.
Figure 7:
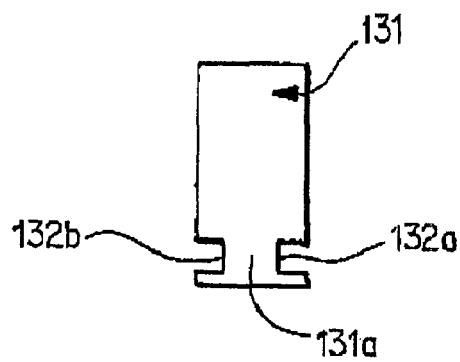
FIG. 7 is a somewhat schematic elevational view on an enlarged scale of the guide hook in accordance with the present invention.

According to the present invention, as illustrated in FIGS. 5-7 of this application, in which similar reference numerals of the 100 series are used, the reopening is prevented in a simple, reliable manner by changing the prior art rectangular aperture 35 (FIG. 3) into a modified aperture generally designated by reference numeral 135 (FIG. 6) of more complex shape. The guide hook member generally designated by reference numeral 131 (FIGS. 5 and 7) is also modified accordingly as will be described more fully hereinafter.

More specifically, the aperture 135 includes a first slot-shaped aperture part 121 having dimensions slightly grater than those of the hook-like member 131, i.e., a width $d_1$ and thickness $l_1$ greater than the width and thickness of the hook-like member 131 so as to be able to slide the hook member 131 into the slot-like aperture part 121. The slot-like aperture part 121 is adjoined by a second aperture part 122 that gradually narrows in the longitudinal direction and is defined by converging surfaces 122a and 122b terminating in a relatively narrower and longer aperture part 123 extending in the longitudinal direction of the clamping band. The converging parts 122a and 122b may be of continuously curved configuration or may be linear preferably passing over into the aperture parts 121 and 123 by rounded-off curvatures of relatively small radius in order to facilitate sliding movement of the hook-like guide member 131 in the longitudinal direction of the clamp. The angle of convergence of surfaces 122a and 122b can be suitably chosen depending on the type and width of the band material, on the size of the width of the hook member 131 which in turn depends to some extent on the width of the clamping band material. The converging surfaces 122a and 122b may thereby form an angle with the longitudinal direction of the clamping band material from about 55° to about 35°, preferably 40 to 50°. The length and angle of the converging surfaces 122a and 122b as also all other dimensions of the aperture 135 may also be empirically determined for optimal condition depending to some extent on the width $d_1$ of the aperture portion 123 which in turn depends on the width of the guide member 131, the length of the required lost-motion path and the material used for the clamping band.

To achieve the lock-up condition of the mechanical connection, the guide member 131 is provided with two substantially rectangular cutouts 132a and 132b in the area directly adjoining the axis x-x about which the guide member is bent out of the clamping band material, i.e., within the area to the left of the axis x-x of FIG. 2. The width h of the cutouts 132*a* and 132*b* is thereby somewhat larger than the thickness of the clamping band material sufficient to permit easy sliding movement of the guide hook member 131 in the area of the aperture parts 122 and 123 and also depends to some extent on the angle α of the hook member 131. The depth d of the cutouts 132*a* and 132*b* must be correlated to the width $d_2$ of the aperture part 123. In each case, the depth of these cutouts 132*a* and 132*b* must be such that the remaining part 131*a* left in the hook member 131 is slightly smaller than the width $d_2$ of the aperture part 123 so that the guide member 130 can readily slide from the aperture part 121 into the aperture part 123. The depth d of the rectangular cutouts 132*a* and 132*b* is preferably such that the remaining reduced width portion 131*a* of the hook member 130 is not weakened excessively while the width of the cutouts 132*a* and 132*b* must be sufficiently greater than the thickness of the clamping band material to allow free sliding movement of the hook member through the aperture part 123. Again, optimum dimensions for the width h and the depth d can be readily determined empirically depending on type and size of the clamping band material. Typical non-limitative values for the depth d of the cutouts 132*a* and 132*b* are such that the width of the reduced width portion 131*a* of the hook member 131 remains preferably at least about 50% of the normal width of the hook member 131, preferably from about 50% to about 70%. For ease of operation, the width h of the cutouts is at least 1.15 times the thickness of the clamping band material.

The length l from the slot-like opening 121 to the end of the aperture part 123 represents the length of the necessary lost-motion path of the mechanical connection and is coordinated to the minimum necessary contraction of the "Oetiker" ear to achieve the sufficient desired plastic deformation thereof. The amount of lost motion necessary, i.e., the amount of contraction of the "Oetiker" ear necessary to achieve the desired plastic deformation can be readily determined by any conventional means, for example, by simply contracting the "Oetiker" ear manually by means of a pincer-like tool and noting the amount of contraction necessary when the "Oetiker" ear has attained the smooth rounded outer configuration of its approximately omega shape. Once this minimum contraction is determined, its value is used directly for purposes of designing the clamp by giving the length l a value for the lost motion which corresponds to this minimum initial contraction necessary for the "Oetiker" ear. By thus correlating the value of initial minimal contraction necessary for sufficient plastic deformation of the ear to the length of the lost-motion path, the clamp according to the present invention will always permit an initial minimal plastic deformation adequate to reach the desired operating characteristics of the "Oetiker" ear. In other words, even if the size of the clamp is such that it will initially already tightly surround the hose with which it is used in the non tightened condition, the lost-motion connection during which contraction of the ear will not be accompanied by a reduction of the diametric dimension of the clamp, will always assure proper plastic deformation.

Furthermore, by utilizing the slot-like opening 121, its location permits a very accurate and simple predetermination of the maximum hose diameter with which the clamp can be used as the hook-like member 131 cannot be inserted through the slot-like part 121 if the diametric dimension of the hose is greater than allowed by the maximum diametric dimension of the clamp when the hook member 131 is first inserted into the slot-like aperture part 121.

OPERATION

The engagement of the mechanical connection in accordance with the present invention is quite simple and does not depart materially from what was done heretofore. All that is necessary is to engage the hook member 131 into the slot-like aperture portion 121 whereupon the residual stress in the clamp seeking to enlarge its diametric dimension is likely to normally cause the guide member 131 to slide toward the aperture portion 123. If necessary, this can be assisted by a slight pressure on the guide member 131 in this direction. Once the guide member 131 leaves the aperture portion 121, the engagement of the cutouts 132*a* and 132*b* with the converging surfaces 122*a* and 122*b* will lock up the mechanical connection against re-opening regardless of the angle α of the hook member 131. When the hook member 131 reaches the aperture portion 123, the mechanical connection remains securely locked against reopening by engagement of the sides of the aperture portion 123 engaging in the cutouts 132*a* and 132*b*. Contraction of the clamp with further contraction of the ear will take place only after the hook member 131 reaches the end of the aperture portion 123, i.e., only after the hook member 131 has moved through the entire lost-motion path.

With clamps equipped with a plastically deformable, so-called "Oetiker" ear which is plastically deformed for tightening the clamp, the guide member 131 will move during contraction of the "Oetiker" ear without any reduction in the diametric dimension of the clamp until it reaches the end of the aperture portion 123 and only then, fixed in such position, will cause a reduction of the clamp diameter during the remaining tightening of the clamp, i.e., during the remaining contraction of the ear.

The present invention thus assures a lock-up of the mechanical connection by extremely simple means that require no major changes in the manufacture of the clamp as only some cutting dies for the aperture 135 and the hook member 131 have to be modified.

In addition, the present invention will permit significant savings in band material as the danger of reopening of the mechanical connection of the clamp is reliably prevented so that, for example, the clamp no longer needs a complex mechanical connection including several guide hook members and possibly also permits elimination of the need for the pressed-out support member 32 of the clamp disclosed in the prior U.S. Pat. No. 4,299,012.

Moreover, with the mechanical connection according to the present invention which allows a slot-like aperture for insertion of the hook member, clamps can be accurately sized to assure proper coverage of a wide range of hose diameters. This also minimizes the danger, especially in the after-market that an improper clamp size is used which prevents sufficient plastic deformation of the ear as explained above.

While I have shown and described only one embodiment in accordance with the present invention, it is understood that the present invention is not limited to the embodiment illustrated but is equally applicable to all other types of open-type clamps which utilize a mechanical connection with a guide hook member of the type described above.

The present invention is also applicable to mechanical connections in which the members extend inwardly from the outer band portion into apertures provided in the inner band portion.

Though the mechanical connection of this invention is shown for use in particular with a clamp (FIG. 1) that includes as tightening device a plastically deformable "Oetiker" ear and an arrangement including a tongue-like extension adapted to engage through an aperture in a step-like portion to avoid any steps or discontinuities at the end of the inner band portion 11b, the invention is equally applicable to clamps omitting the step-preventing arrangement 61, 63, 67 and to tightening devices other than "Oetiker" ears.

Moreover, while the cutouts symmetrically arranged on both sides of the hook member are preferable, it is within the purview of this invention to provide a cutout on only one side of the hook member so that only one converging side on the corresponding side of the aperture 135 needs to be provided while the opposite side of this aperture needs to be redesigned accordingly.

The significant improvements of a clamp in accordance with the present invention can be readily recognized by the ability to provide a positive lock-up of the mechanical connection by extremely simple means that require only changes in cutting dies for the incorporation into existing manufacturing operations. Additionally, the clamps can be accurately sized in relation to the maximum diametric dimension of the hose with which the clamp can be used without impairment of the lost motion function of the connection whereby the lost motion function can be realized in an extremely simple manner.

The present invention is thus not limited to the embodiment illustrated but may be varied to suit any particular need, and I therefore do not wish to be limited to the illustrated embodiment, but intend to cover all such changes and modifications as are encompassed by the scope of the appended claims.

What is claimed is:

1. An open-type hose clamp, comprising clamping band means having overlapping inner and outer band portions, a mechanical connection between overlapping band portions including a tab-like member extending outwardly from the inner band portion and adapted to engage in an aperture means in the outer band portion, a tightening device for tightening the clamp,
characterized by further means in said mechanical connection for accurately limiting the use of the clamp with a hose of predetermined maximum diametric dimension,
said further means including a slot-like aperture forming part of said aperture means and being of a width and length complementary to the width and length of the cross section of said tab-like member so that said tab-like member can be connected with said outer portion only in a predetermined position determined by said slot-like aperture and only at the precise location of said slot-like aperture so that said location determines the maximum outer diameter of a hose with which the clamp can be used.

2. An open-type hose clamp according to claim 1, wherein said tab-like member has thickness and width dimensions, and wherein said means includes a slot-like aperture portion in said aperture means of dimensions corresponding to but slightly larger than those of the hook member to enable said hook member to slide into said slot-like aperture portion and thereby determine precisely the maximum diametric clamp dimension at which the clamp can be installed over a hose.

3. An open-type hose clamp according to claim 2, wherein the clamp includes a plastically deformable ear as tightening device which requires a predetermined amount of plastic deformation for proper operation, and wherein said aperture includes further means enabling said predetermined plastic deformation of the ear under all conditions in which said clamp can be installed over a hose.

4. An open-type hose clamp according to claim 3, wherein said further means includes a lost-motion means during which plastic deformation of the car is substantially without reduction of the diametric dimension of the clamp.

5. An open-type hose clamp according to claim 4, wherein the required length of lost motion to achieve the predetermined plastic deformation substantially corresponds to the amount of contraction of the ear required for that purpose.

6. An open type hose clamp according to claim 5, wherein said lost-motion means includes an aperture portion in which aperture means in communication with said slot-like aperture and having a length in the circumferential direction of the clamp corresponding substantially to the length of required lost motion.

7. An open-type hose clamp according to claim 6, wherein said mechanical connection includes means for positively locking the mechanical connection against inadvertent reopening during tightening of the clamp.

8. An open-type hose clamp according to claim 7, wherein said means for positively locking the mechanical connection is operable to lock up the mechanical connection during substantially the entire tightening operation of the clamp.

9. An open-type hose clamp according to claim 7, in which said aperture means includes, in addition to said slot-like aperture, an aperture portion narrower than said slot-like aperture for engagement with lateral cutout portions located in the area adjacent an inner end of said tab-like member near where the hook member is bent out of the inner band portion.

10. An open-type hose clamp according to claim 9, wherein said slot-like aperture and said narrower aperture portion are connected by way of converging surface portions.

11. An open-type hose clamp according to claim 10, wherein said converging surface portions pass over into the slot-like aperture and into the narrower aperture portion by way of rounded-off surface portions.

12. An open-type hose clamp according to claim 1, wherein said connection includes means for positively locking the mechanical connection against inadvertent reopening during tightening of the clamp, said last-mentioned means including, in addition to said slot-like aperture, an aperture portion narrower than said slot-like aperture for engagement with at least one lateral cut-out means located in the area adjacent an inner end of said tab-like member.

13. An open-type hose clamp according to claim 12, in which said aperture means includes, in addition to said slot-like aperture portion, an aperture portion narrower than said slot-like aperture for engagement with lateral cutout portions in the hook member in the area thereof directly adjacent to where the hook member is bent out of the inner band portion.

14. An open-type hose clamp according to claim 13, wherein said slot-like aperture and said narrower aperture portion are connected by way of converging surface portions.

15. An open-type hose clamp according to claim 14, wherein said converging surface portions pass over into the slot-like aperture portion and into the narrower aperture portion by way of rounded-off surface portions.

16. An open-type hose clamp according to claim 14, wherein the angle of said converging portions with the longitudinal direction of the clamping band is from about 30° to about 65°.

17. An open-type hose clamp according to claim 16, wherein said angle is between about 55° to about 35°.

18. An open-type hose clamp according to claim 13, wherein the width of the cutout portions is at least about 1.15 times the thickness of the band material.

19. An open-type hose clamp according to claim 18, wherein the cutout portions are provided in the two lateral areas of the hook member, and wherein the cutout portions, which are of substantially the same depth, leave a hook member portion of reduced width.

20. An open-type hose clamp according to claim 19, wherein the reduced width portion of the hook member is at least about 50% of the normal width of the hook member.

21. An open-type hose clamp according to claim 20, wherein said reduced width portion is from about 50% to about 70% of the normal width of the hook member.

* * * * *